(12) United States Patent
Oota et al.

(10) Patent No.: US 10,679,409 B2
(45) Date of Patent: Jun. 9, 2020

(54) THREE-DIMENSIONAL MODEL CREATING DEVICE

(71) Applicant: FANUC CORPORATION, Yamanashi (JP)

(72) Inventors: Rie Oota, Yamanashi (JP); Mamoru Kubo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/129,805

(22) Filed: Sep. 13, 2018

(65) Prior Publication Data
US 2019/0080511 A1 Mar. 14, 2019

(30) Foreign Application Priority Data

Sep. 13, 2017 (JP) ................. 2017-175420

(51) Int. Cl.
*G05B 19/4099* (2006.01)
*G06T 19/00* (2011.01)
(Continued)

(52) U.S. Cl.
CPC .......... *G06T 17/20* (2013.01); *G05B 19/4099* (2013.01); *G06T 7/593* (2017.01); *G06T 17/10* (2013.01); *G05B 2219/49007* (2013.01); *G06T 7/0004* (2013.01); *G06T 19/00* (2013.01); *G06T 2200/08* (2013.01); *G06T 2200/24* (2013.01); *G06T 2207/10012* (2013.01);
(Continued)

(58) Field of Classification Search
None
See application file for complete search history.

(56) References Cited

U.S. PATENT DOCUMENTS 5,892,515 A * 4/1999 Kobayashi .............. G06T 17/20
345/419
2004/0107018 A1 6/2004 Nakamura
(Continued)

FOREIGN PATENT DOCUMENTS

| JP | 2004-185123 A | 7/2004 |
| JP | 2006-102923 A | 4/2006 |
| JP | 2014-206910 A | 10/2014 |

OTHER PUBLICATIONS

Taesung Yoon, et al, "Decomposition of a Welded Part by Iterative Loop Generation Based on Multiple Feature Recognition", The Japan Society of Precision Manufacturing, 1996, vol. 62, No. 12, pp. 1707-1711, 5pp.

*Primary Examiner* — Kyle Zhai
(74) *Attorney, Agent, or Firm* — Hauptman Ham, LLP (57) ABSTRACT

A three-dimensional model creating device creates an individual model indicating an individual shape of an object from an integrated model created based on data obtained by capturing images of or measuring at least two or more objects together. The three-dimensional model creating device includes: a three-dimensional model division processing unit configured to create a plurality of divided models obtained by dividing the integrated model by an extension plane extended from each plane configured to form the integrated model; a user interface unit configured to receive tagging of each of the divided models; and an individual model creating unit configured to create the individual model of the object based on the tagging of each of the divided models.

5 Claims, 5 Drawing Sheets

(51) Int. Cl.
*G06T 17/20* (2006.01)
*G06T 7/593* (2017.01)
*G06T 17/10* (2006.01)
*G06T 7/00* (2017.01)

(52) U.S. Cl.
CPC ............ *G06T 2207/10028* (2013.01); *G06T 2207/30164* (2013.01); *G06T 2219/004* (2013.01); *G06T 2219/008* (2013.01)

(56) References Cited

U.S. PATENT DOCUMENTS

| | | | |
|---|---|---|---|
| 2007/0174769 A1* | 7/2007 | Nycz | A61B 6/465 715/700 |
| 2014/0309766 A1 | 10/2014 | Kunimitsu et al. | |
| 2018/0061058 A1* | 3/2018 | Xu | G06K 9/6269 |

* cited by examiner

OBTAIN IMAGES OF JIG
AND WORKPIECE

CONFIGURE
THREE-DIMENSIONAL
MODEL FROM IMAGES

CONFIGURE
THREE-DIMENSIONAL MODEL
FROM IMAGES

DIVIDE THREE-DIMENSIONAL
MODEL ACCORDING TO
RIDGELINE CONNECTION
RELATIONSHIP

TAG DIVIDED MODELS

THREE-DIMENSIONAL MODEL CREATING DEVICE

RELATED APPLICATIONS

The present application claims priority of Japanese Patent Application No. 2017-175420, filed on Sep. 13, 2017, the disclosure of which is hereby incorporated by reference herein in its entirety.

BACKGROUND OF THE INVENTION

1. Field of the Invention

The present invention relates to a three-dimensional model creating device. More particularly, the present invention relates to a three-dimensional model creating device which creates interference check data from an image.

2. Description of the Related Art

There is a technique of detecting an interference of a structure of a machine tool or a tool or a workpiece. A three-dimensional interference check function which is a conventional technique of detecting interference is generally a method for expressing a three-dimensional shape of interference check objects by combining stereo models such as a rectangular parallelepiped and a cylinder, and checking whether or not the models interfere with each other by performing three-dimensional simulation.

When the three-dimensional interference check function is used to check interference, three-dimensional models created by CAD are necessary as data for three-dimensional simulation. However, a machining target workpiece and a jig used to fix the workpiece are different every time a machine tool performs machining. An operator needs to create these three-dimensional models every time. Furthermore, although the shape of the workpiece changes when the workpiece is machined by a tool (contacts the tool), the shape of the jig does not generally change and contact between the jig and the tool is a portion which needs to be decided as an interference. Therefore different three-dimensional models of the workpiece and the jig need to be created.

For example, JP 2004-185123 A discloses a method for generating image data by capturing images of a structure which forms a machine tool from X axis, Y axis and Z axis directions by two cameras, generating image data, and generating three-dimensional shape data of the structure based on each image data as a technique of assisting creation of the three-dimensional model. Furthermore, JP 2006-102923 A discloses a technique of detecting each shape from images showing that a chuck and a workpiece are not attached to a lathe and an image showing that the chuck and the workpiece are attached to the lathe, and calculating an interference region. Furthermore, JP 2014-206910 A discloses a technique of generating an individual model of a jig based on a three-dimensional model of a workpiece and data obtained by integrally measuring shapes of the workpiece and a jig by three-dimensional measurement.

However, the conventional technique disclosed in JP 2004-185123 A creates an integrated three-dimensional model of the workpiece and the jig. The workpiece and the jig cannot be distinguished from such a three-dimensional model. Therefore, the workpiece and the jig cannot be checked separately by interference check. Furthermore, the conventional technique disclosed in JP 2006-102923 A needs to separately capture an image showing that the workpiece and the chuck (jig) are not attached and an image showing that the workpiece and the chuck are attached when the three-dimensional model is created. Therefore, it cannot be said that the conventional technique can sufficiently reduce an effort to create the three-dimensional model. Furthermore, the conventional technique disclosed in JP 2014-206910 A cuts out the three-dimensional model of the jig by using the three-dimensional model of the workpiece from the integrated three-dimensional model of the workpiece and the jig. However, the operator needs to create the three-dimensional model of the workpiece by using the CAD. Therefore, although the operator does not need an effort to create the three-dimensional model of the jig, the operator needs to create the three-dimensional model of the workpiece.

SUMMARY OF THE INVENTION

It is therefore an object of the present invention to provide a three-dimensional model creating device which can create three-dimensional models of a workpiece and a jig by performing image capturing or measurement once.

The three-dimensional model creating device according to the present invention has a function of separately creating a three-dimensional model of a workpiece and a three-dimensional model of a jig based on images obtained by capturing images of or measuring the workpiece and the jig to which the workpiece is attached together, and a simple operation of the operator in order to solve the above problem.

Figure 6:
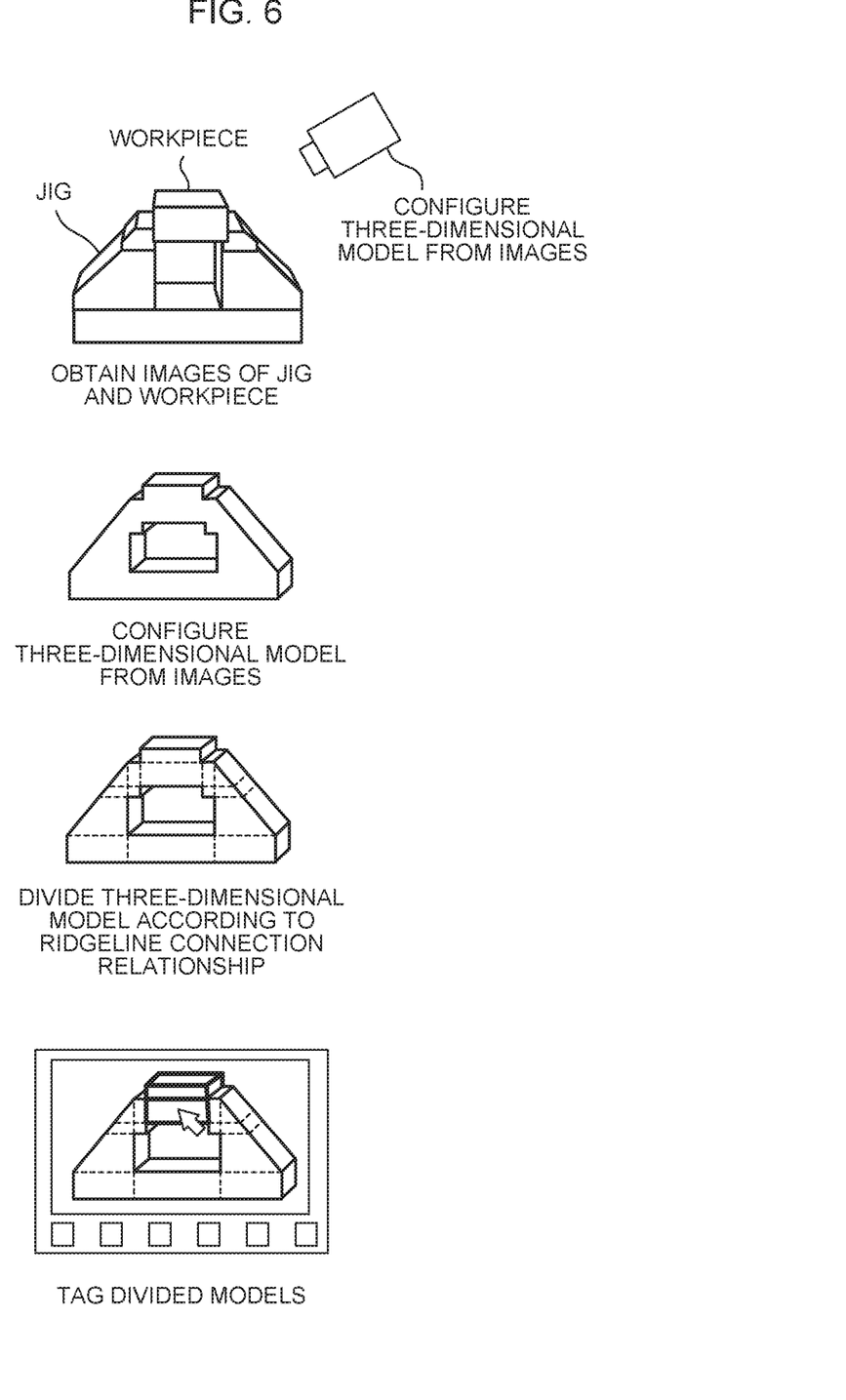
FIG. 6 is a view for explaining a three-dimensional model creating method according to the present invention.

As shown in, for example, FIG. 6, the three-dimensional model creating device according to one embodiment of the present invention configures a three-dimensional model from the captured or measured images, divides the three-dimensional model into parts of a plurality of three-dimensional models according to a connection relationship between ridgelines of the configured three-dimensional model, makes an operator tag the divided parts of the three-dimensional model, and creates individual three-dimensional models of the jig and the workpiece from the tagged models.

Furthermore, one aspect of the present invention is a three-dimensional model creating device configured to create an individual model indicating an individual shape of an object from an integrated model created based on data obtained by capturing images of or measuring at least two or more objects together, and including: a three-dimensional model division processing unit configured to create a plurality of divided models obtained by dividing the integrated model by an extension plane extended from each plane configured to form the integrated model; a user interface unit configured to receive tagging of each of the divided models; and an individual model creating unit configured to create the individual model of the object based on the tagging of each of the divided models.

An operator can create respective individual three-dimensional models of a jig and a workpiece from images obtained by capturing images of or measuring the workpiece and the jig to which the workpiece is attached together, so that the present invention can substantially reduce an effort to create the three-dimensional models.

BRIEF DESCRIPTION OF THE DRAWINGS

Aforementioned objects and other objects and characteristics of the present invention will be made more apparent from description of the following embodiment in view of the accompanying drawings. Of these drawings.

DETAILED DESCRIPTION OF THE PREFERRED EMBODIMENTS

A configuration example of a three-dimensional model creating device for realizing the present invention will be described below.

Figure 1:
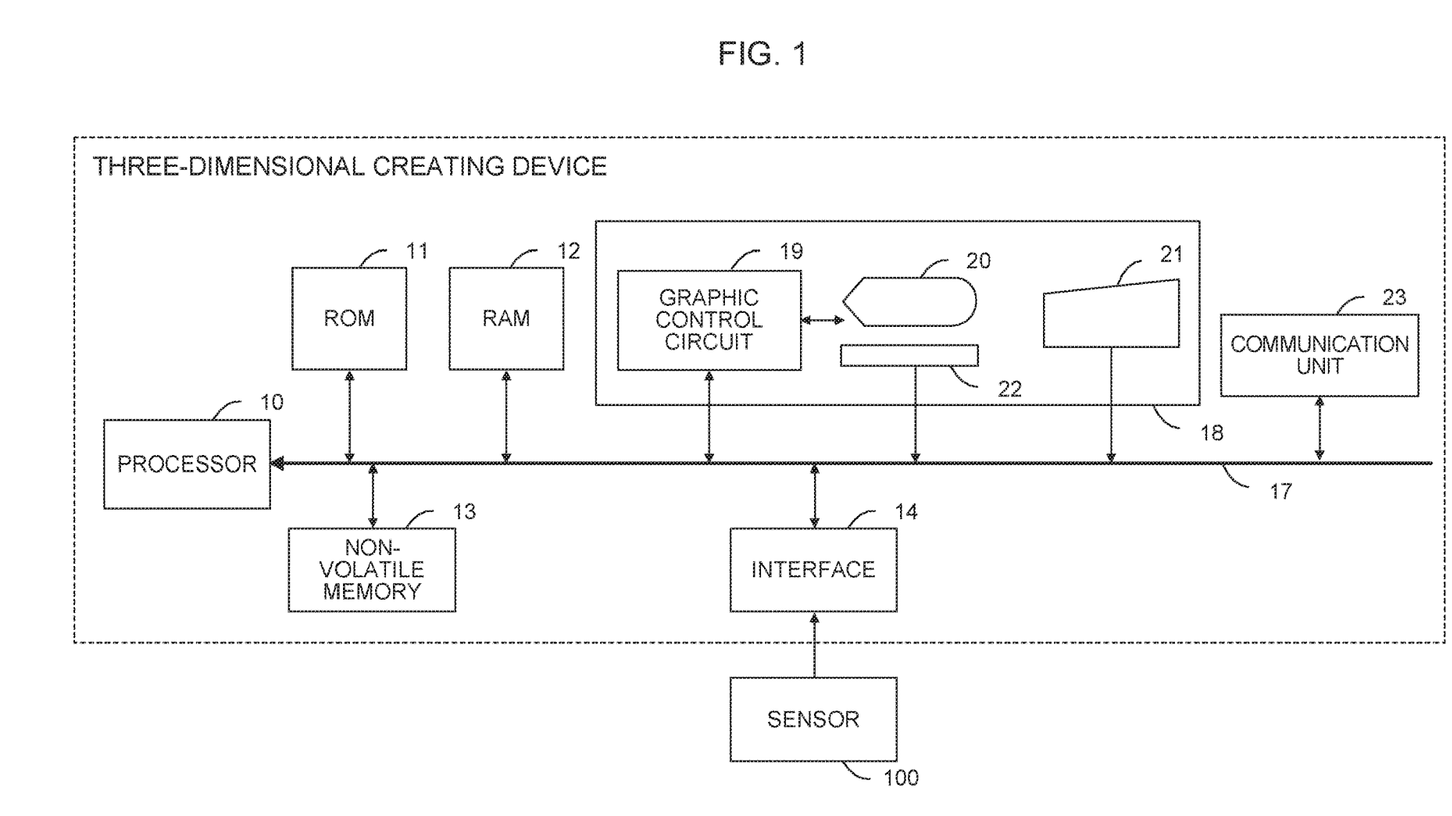
FIG. 1 is a schematic hardware configuration diagram showing main units of a three-dimensional model creating device according to one embodiment.

FIG. 1 is a schematic hardware configuration diagram showing main units of the three-dimensional model creating device according to one embodiment. A three-dimensional model creating device 1 according to the present embodiment can be implemented as, for example, a numerical controller. Furthermore, the three-dimensional model creating device 1 according to the present embodiment can be implemented as a personal computer installed next to a machine tool, for example. Furthermore, the three-dimensional model creating device 1 according to the present embodiment can be also implemented as an interference check device installed next to the machine tool, for example. FIG. 1 shows a hardware configuration example of the three-dimensional model creating device 1 implemented as the personal computer.

The three-dimensional model creating device 1 is mainly composed of a processor 10. Each component of the three-dimensional model creating device 1 is connected via a bus 17, and exchanges data with each other via the bus 17.

The processor 10 controls the entire three-dimensional model creating device 1 according to a system program stored in a ROM 11. An EPROM or an EEPROM is used for this ROM 11.

A DRAM or the like is used for a RAM 12, and temporary calculation data, display data, and an input/output signal are stored therein. A CMOS or an SRAM backed up by a battery which is not shown is used for a non-volatile memory 13, and parameters which need to be held after a power supply is turned off are stored therein.

A machine operation panel 18 is disposed on a front surface of the three-dimensional model creating device 1, displays data and figures necessary for an operation of the three-dimensional model creating device 1, and receive an input of a manual operation of an operator and an input of data, and is used for the operation of the three-dimensional model creating device 1. A graphic control circuit 19 converts a digital signal such as numerical data and figure data into a display Raster signal and sends the digital signal to a display device 20, and the display device 20 displays these numerical value and figure. A liquid crystal display device is mainly used for the display device 20.

An input device 21 is composed of a keyboard including a key switch, a rotary switch, numerical keys, symbolic keys, character keys and function keys, and a pointing device such as a mouse.

A touch panel 22 has a function of detecting an operator's operation such as touch or drag. The touch panel 22 is superimposed and arranged on a screen of the display device 20, and the touch panel 22 can detect the operation performed by the operator on a software key, a software button or a software switch displayed on the screen of the display device 20. In this regard, the touch panel 22 and the display device 20 may be combined and configured as one device.

A communication unit 23 performs data communication between the numerical controller, the interference check device, a cell computer and a host computer via a wired/wireless network. Three-dimensional model data created by the three-dimensional model creating device 1 is transmitted to the numerical controller via the communication unit 23, for example.

An interface 14 is an interface which imports data obtained by a sensor 100 by performing image capturing or measurement, to the three-dimensional model creating device 1. As long as the sensor 100 can obtain data for creating a three-dimensional model, any sensor may be used. For the sensor 100, for example, a camera and a distance sensor can be used, and, more suitably, a three-dimensional distance image camera or stereo vision which can obtain an image capturing target image and a distance from an image capturing position to each pixel of the image can be used.

Figure 2:
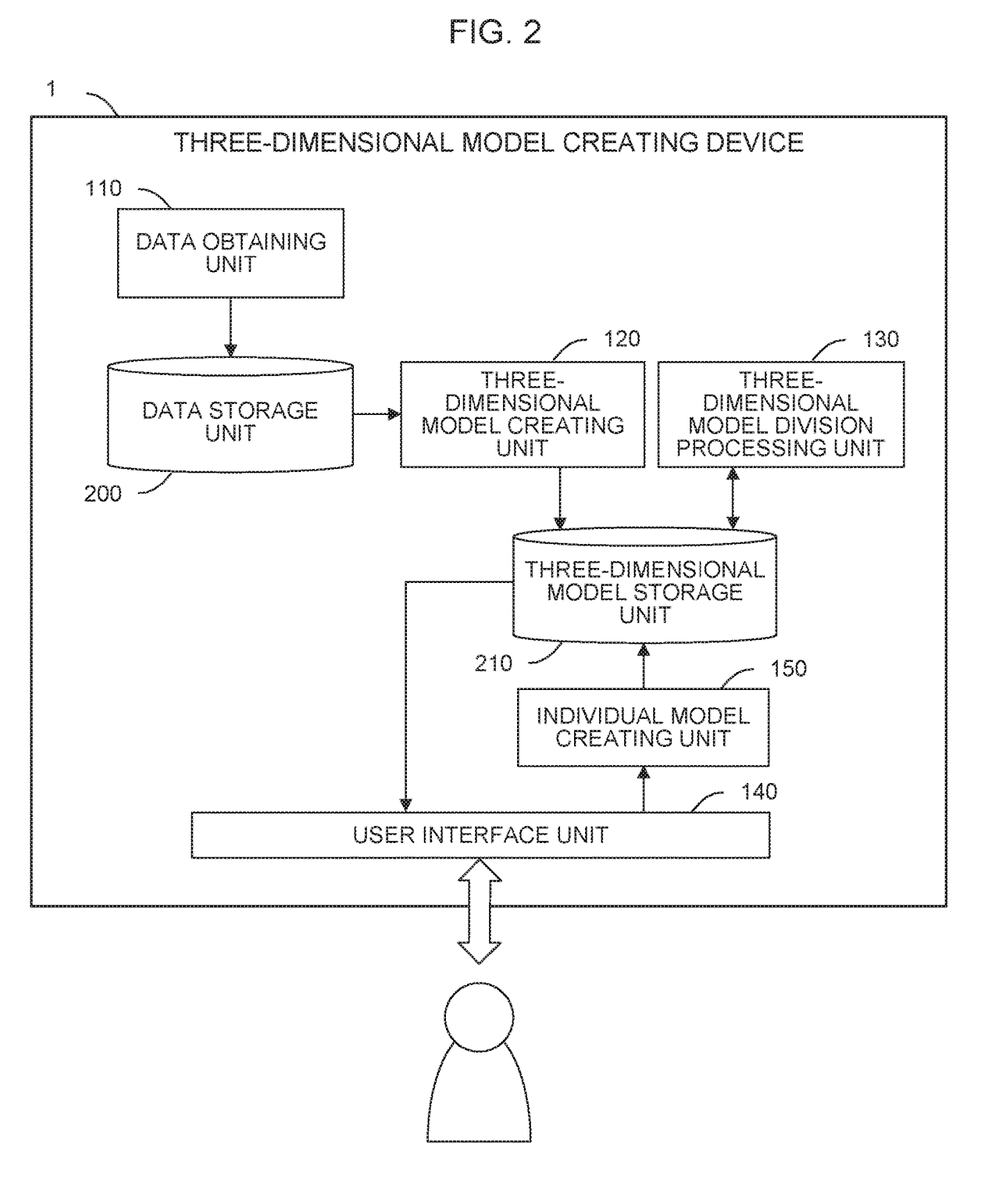
FIG. 2 is a schematic functional block diagram of the three-dimensional model creating device according to one embodiment.

FIG. 2 is a schematic functional block diagram showing the main units of the three-dimensional model creating device according to one embodiment of the present invention when the system program which realizes a three-dimensional model creating function according to the present invention is executed by the three-dimensional model creating device 1 shown in FIG. 1. Each functional block shown in FIG. 2 is implemented when the processor 10 of the three-dimensional model creating device 1 shown in FIG. 1 executes the system program for the three-dimensional model creating function and controls an operation of each unit of the three-dimensional model creating device 1. The three-dimensional model creating device 1 according to the present embodiment includes a data obtaining unit 110, a three-dimensional model creating unit 120, a three-dimensional model division processing unit 130, a user interface unit 140 and an individual model creating unit 150. Furthermore, a data storage unit 200 which stores images obtained by capturing images of or measuring a workpiece and a jig to which the workpiece is attached together, and a three-dimensional model storage unit 210 which stores three-dimensional models are secured on the non-volatile memory 13.

The data obtaining unit 110 is a functional unit which obtains data obtained by the sensor 100 by performing image capturing or measurement, and stores the data in the data storage unit 200. The data obtaining unit 110 may store in the data storage unit 200 a pair of a plurality of items of data obtained by the sensor 100 by capturing images of or measuring, for example, a workpiece and a jig to which the workpiece is attached, from a plurality of directions.

The three-dimensional model creating unit 120 is a functional unit which creates a three-dimensional model from data which is stored in the data storage unit 200 and is obtained by capturing images of or measuring the workpiece and the jig to which the workpiece is attached together. The three-dimensional model creating unit 120 stores the three-dimensional model created from the data stored in the data storage unit 200 as an integrated model of the workpiece and the jig in the three-dimensional model storage unit 210.

Generally, various methods such as a volume intersection method or a stereo matching method are known as a method for creating a three-dimensional model from an image which is data. Any method may be used as the method of the three-dimensional model creating unit 120 for creating a three-dimensional model as long as the method can create the three-dimensional model based on results obtained by some unit by capturing images of or measuring the workpiece and the jig to which the workpiece is attached.

A method which uses a three-dimensional distance image will be described as an example of three-dimensional model creation performed by the three-dimensional model creating unit 120. According to this method, the data obtaining unit 110 first captures images of the workpiece and the jig to which the workpiece is attached together from a plurality of directions by using the three-dimensional distance image camera or the stereo vision which is the sensor 100, obtains a plurality of distance images, and stores the distance images in the data storage unit 200. When the three-dimensional distance image camera is used to capture distance images, the three-dimensional distance image camera may be installed in advance at a predetermined position, or may be attached to a spindle of the machine tool or a robot installed next to the machine tool and be axially moved to a predetermined position to capture images. Furthermore, as shown in FIG. 3, when a target image is obtained by using the stereo vision, distance images are obtained according to the following procedure.

Figure 3:
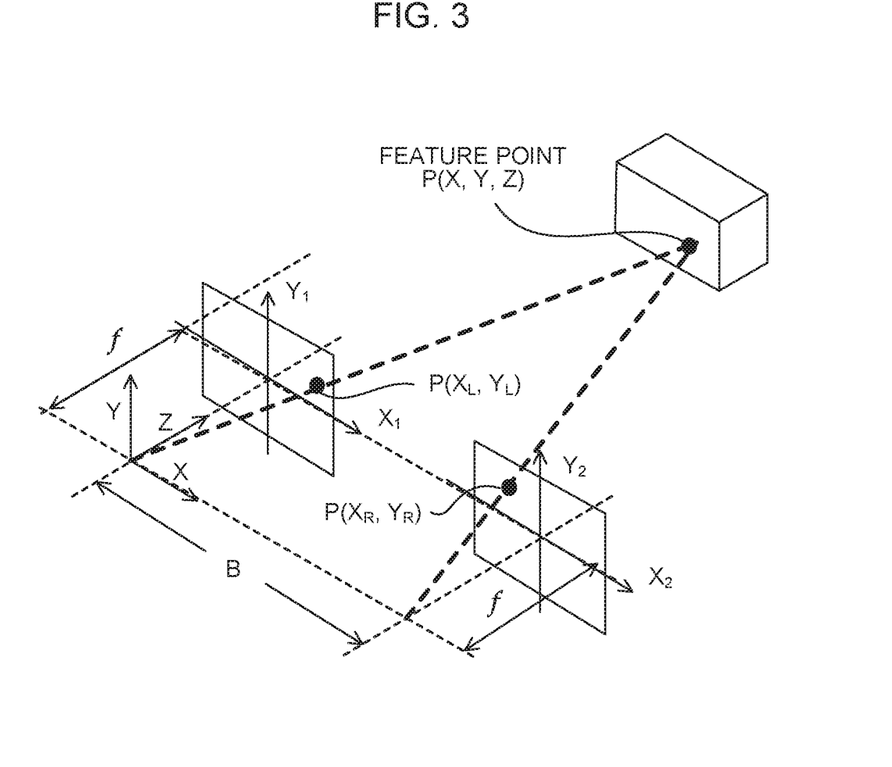
FIG. 3 is a view for explaining a method for creating a three-dimensional model by stereo vision.

[Procedure a1] Detect feature points in an image
[Procedure a2] Associate feature points between images (a right eye image $(X_R, Y_R)$ and a left eye image $(X_L, Y_L)$ in FIG. 3)
[Procedure a3] Calculate a three-dimensional position by using the following equation of mathematical 1 based on detected corresponding points.

$$X=(B/(X_L-X_R))\cdot X_L$$

$$Y=(B/(X_L-X_R))\cdot Y_L$$

$$z=(B/(X_L-X_R))\cdot f \quad \text{[Mathematical 1]}$$

(Here, f is the focal length, B is the baseline length.)

The three-dimensional model creating unit 120 adjusts positions of images captured by parallel movement and rotation to the same coordinate system as those of a plurality of distance images obtained in this way. Furthermore, by using a plurality of distance images whose positions have been adjusted to the same coordinate system, the three-dimensional model creating unit 120 calculates a signed distance on a voxel, and creates a mesh by using Marching cubes.

Furthermore, the three-dimensional model creating unit 120 creates a three-dimensional model simplified by the following procedure for the mesh created in this way.
[Procedure b1] Calculate a unit normal vector of a plane of each mesh of the three-dimensional model.
[Procedure b2] Calculate a cross product of the unit normal vector and unit normal vectors of adjacent planes.
[Procedure b3] Regard the planes as the same planes and synthesize planes when a value of the calculated cross product is a predetermined threshold or less.

Figure 4:
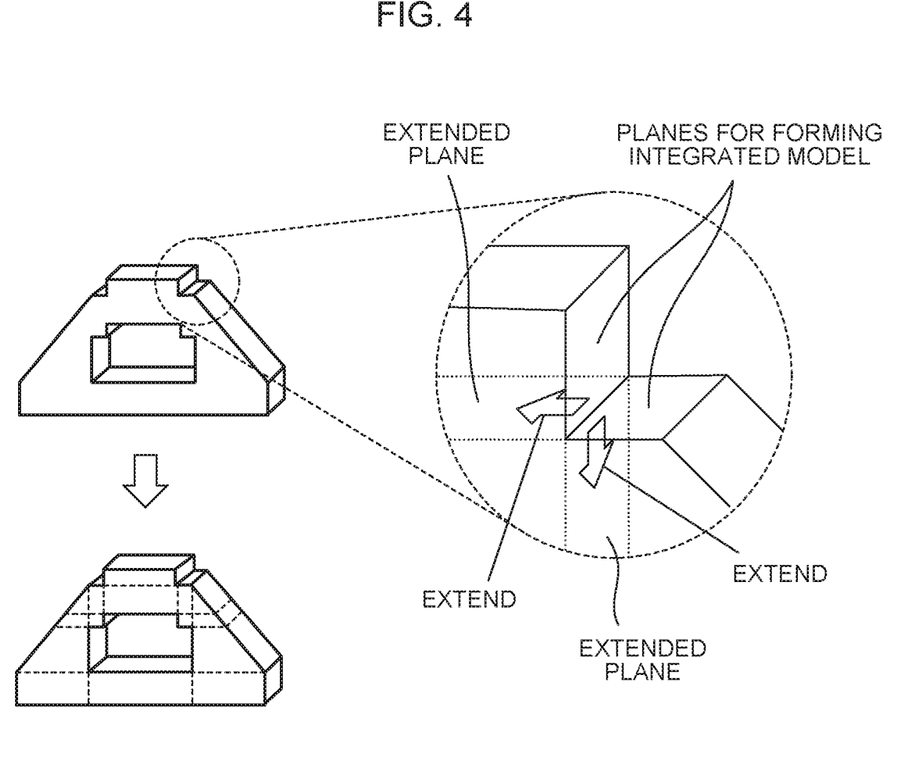
FIG. 4 is a view showing an example of an integrated model dividing method.

The three-dimensional model division processing unit 130 is a functional unit which creates divided models obtained by dividing each portion of an integrated model based on the integrated model of a workpiece and a jig stored in the three-dimensional model storage unit 210. As shown in FIG. 4, the three-dimensional model division processing unit 130 divides the integrated model by an extension plane extended from each plane for forming the integrated model. The three-dimensional model division processing unit 130 stores in the three-dimensional model storage unit 210 the divided models obtained by dividing the integrated model stored in the three-dimensional model storage unit 210.

Figure 5:
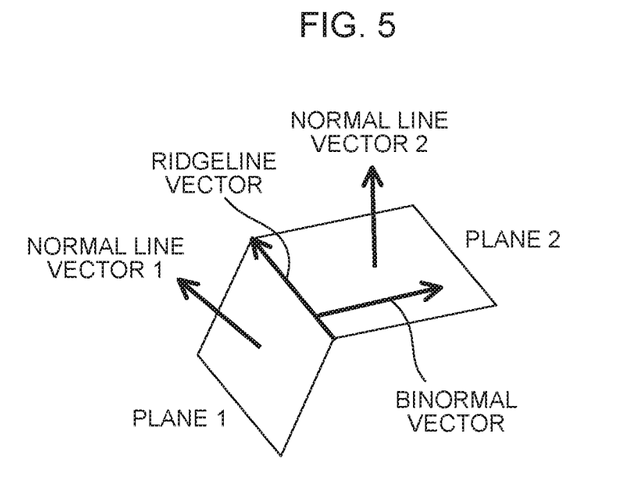
FIG. 5 is a view showing an example of a deciding method for a recess ridgeline and protrusion ridgeline.

Various algorithms can be considered as an integrated model dividing algorithm of the three-dimensional model division processing unit 130. For example, an exemplary algorithm may decide whether a ridgeline (a border line at which a plane and a plane are in contact) of each portion of the integrated model is a recess ridgeline or a protrusion ridgeline, expand a plane to a position intersecting another ridgeline in a direction (a positive/negative direction of a binormal vector) of a binormal line of a plane connected to the recess ridgeline, and divide a model at a point at which the ridgeline and another ridgeline intersect. When this method is adopted, the three-dimensional model division processing unit 130 decides whether the ridge line (the border line at which the plane and the plane are in contact) of each portion of the integrated model is a recess ridgeline or a protrusion ridgeline according to, for example, the following procedure (FIG. 5).

[Procedure c1] Calculate each normal vector (which travels toward a top side of an object) of a plane 1 and a plane 2 (a plane on a right side seen from the top side of the object with respect to the ridgeline vector is the plane 2) which are in contact with a decision target ridgeline (vector).
[Procedure c2] Calculate a binormal vector of a normal vector and a ridgeline vector of the plane 2.
[Procedure c3] Calculate a dot product of the normal vector of the plane 1 and the calculated binormal vector, and decide that the ridgeline is the protrusion ridgeline when the dot product is negative, and that the ridgeline is the recess ridgeline when the dot product is positive.

The above three-dimensional model dividing algorithm is already known as in "Taesung Yoon., two others, "Decomposition of a Welded Part by Iterative Loop Generation Based on Multiple Feature Recognition", The Japan Society for Precision Manufacturing, volume 62, No. 12, p. 1707-1711", and therefore further detailed description will be omitted in this description.

The user interface unit 140 is a functional unit which displays the divided models stored in the three-dimensional model storage unit 210 on the display device 20 to preset to the operator, and requests that the operator tags the divided models displayed on the display device 20 by using the input device 21 and the touch panel 22. The user interface unit 140 may receive tagging of each divided model indicating whether each divided model is a workpiece or a jig. The user interface unit 140 may receive operator's selection of a plurality of divided models, and simultaneously tag a plurality of selected divided models.

The individual model creating unit 150 is a functional unit which creates an individual model by using a divided model to which the same tag is allocated as one model based on the tag allocated to each divided model by the operator. The individual model creating unit 150 creates the individual model of the workpiece from the tagged divided models of the workpiece, and creates the individual model of the jig from the tagged divided models of the jig. The individual model creating unit 150 may create a plurality of individual models associated with the same tag when the divided models to which the same tag is allocated are not in contact.

The individual model creating unit 150 stores in the three-dimensional model storage unit 210 the individual model obtained from the divided models stored in the three-dimensional model storage unit 210.

In this way, the individual models of the workpiece and the jig created by the three-dimensional model creating device 1 according to the present embodiment and stored in the three-dimensional model storage units 210 are used by a machining simulation function and an interference check function of the numerical controller and the interference check device.

The embodiment according to the present invention has been described above. However, the present invention is not limited only to examples of the above embodiment and can be carried out in various modes by adding optional changes.

For example, the above embodiment has described the example where individual models of a workpiece and a jig are created from an integrated model obtained by capturing images of the workpiece and the jig to which the workpiece is attached together. However, the embodiment can be used for other purposes such as creation of individual models of a tool and a spindle from, for example, an integrated model obtained by capturing images of the tool and the spindle together.

What is claimed is:

1. A three-dimensional model creating device configured to create an individual model indicating an individual shape of an object from an integrated model created based on data obtained by capturing images of or measuring at least two or more objects together, the three-dimensional model creating device comprising a processor configured to:
   create a plurality of divided models obtained by dividing the integrated model by an extension plane extended from each plane configured to form the integrated model;
   present the divided models to a user;
   allow the user to put a tag on each of the divided models indicating what object each of the divided models belongs to;
   receive tagging of each of the divided models; and
   create the individual model of the object based on the tagging of each of the divided models,
   wherein the processor is configured to divide the integrated model by extending a plane connected to a ridgeline decided as a recess ridgeline, to a position intersecting another ridgeline in a direction of a binormal line.

2. The three-dimensional model creating device according to claim 1, wherein the object includes a workpiece and a jig.

3. The three-dimensional model creating device according to claim 1 configured to create the individual model of the object by using divided models to which the same tag is allocated as one model.

4. The three-dimensional model creating device according to claim 1, wherein the processor is configured to divide the integrated model at a point at which a ridgeline and another ridgeline intersect.

5. A three-dimensional model creating device configured to create an individual model indicating an individual shape of an object from an integrated model created based on data obtained by capturing images of or measuring at least two or more objects together, the three-dimensional model creating device comprising a processor configured to:
   create a plurality of divided models obtained by dividing the integrated model by an extension plane extending from each plane configured to form the integrated model, wherein the processor is configured to divide the integrated model by
   deciding whether each ridgeline of the integrated model is a recess ridgeline or a protrusion ridgeline,
   extending a plane of the integrated model connected to the ridgeline decided as the recess ridgeline, to a position intersecting another ridgeline in a direction of a binormal line, and
   dividing the integrated model at a point at which the ridgeline and the another ridgeline intersect,
   receive tagging of each of the divided models, and
   create the individual model of the object based on the tagging of each of the divided models.

* * * * *